(12) United States Patent
Hwang et al.

(10) Patent No.: US 10,962,429 B2
(45) Date of Patent: Mar. 30, 2021

(54) METHOD FOR ESTIMATING RACK FORCE OF STEER BY WIRE SYSTEM

(71) Applicants: Hyundai Motor Company, Seoul (KR); KIA Motors Corporation, Seoul (KR)

(72) Inventors: Sang Woo Hwang, Seoul (KR); Young Dae Park, Chungcheongnam-do (KR); Byung Rim Lee, Gyeonggi-do (KR); Min Jun Kim, Busan (KR); Se Hyun Chang, Gyeonggi-do (KR); Hyeon Seok Cho, Gyeonggi-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 252 days.

(21) Appl. No.: 16/179,423

(22) Filed: Nov. 2, 2018

(65) Prior Publication Data

US 2020/0088596 A1 Mar. 19, 2020

(30) Foreign Application Priority Data

Sep. 17, 2018 (KR) ........................ 10-2018-0110664

(51) Int. Cl.
*G01L 5/22* (2006.01)
*B62D 5/00* (2006.01)
*B62D 6/00* (2006.01)

(52) U.S. Cl.
CPC .............. *G01L 5/221* (2013.01); *B62D 5/006* (2013.01); *B62D 6/008* (2013.01)

(58) Field of Classification Search
CPC ......... G01L 5/221; B62D 5/006; B62D 6/008; B62D 5/0424; B62D 15/02
See application file for complete search history.

(56) References Cited

U.S. PATENT DOCUMENTS

| 2014/0316658 | A1* | 10/2014 | Chai | ...................... B62D 6/008 |
| | | | | 701/42 |
| 2015/0217801 | A1* | 8/2015 | Takeda | ...................... B62D 6/10 |
| | | | | 701/42 |
| 2017/0349205 | A1* | 12/2017 | Kaneko | ................. B62D 5/0448 |
| 2020/0017139 | A1* | 1/2020 | Ramanujam | ........... B62D 6/008 |

FOREIGN PATENT DOCUMENTS

| JP | 5313729 B2 | 10/2013 |
| KR | 1020170078405 A | 12/2015 |
| KR | 20170019669 A | 2/2017 |

\* cited by examiner

*Primary Examiner* — Peter D Nolan
*Assistant Examiner* — Ashley L Redhead, Jr.
(74) *Attorney, Agent, or Firm* — Brinks Gibson & Lione

(57) ABSTRACT

The present disclosure relates to a technology of estimating rack force using force that is transmitted from a steering motor of a Steer-By-Wire (SBW) system to a rack bar. The present disclosure provides a method for estimating rack force of an SBW system, the method calculating restoring force that is applied to a reducer on the basis of the difference between position values of the rack bar that are obtained at the front end and the rear end of the reducer when the position of the rack bar is changed by operation of a steering motor; and calculating rack force by reflecting the restoring force to a motion equation including inertia force of the SBW system.

7 Claims, 2 Drawing Sheets

[Fig.1]
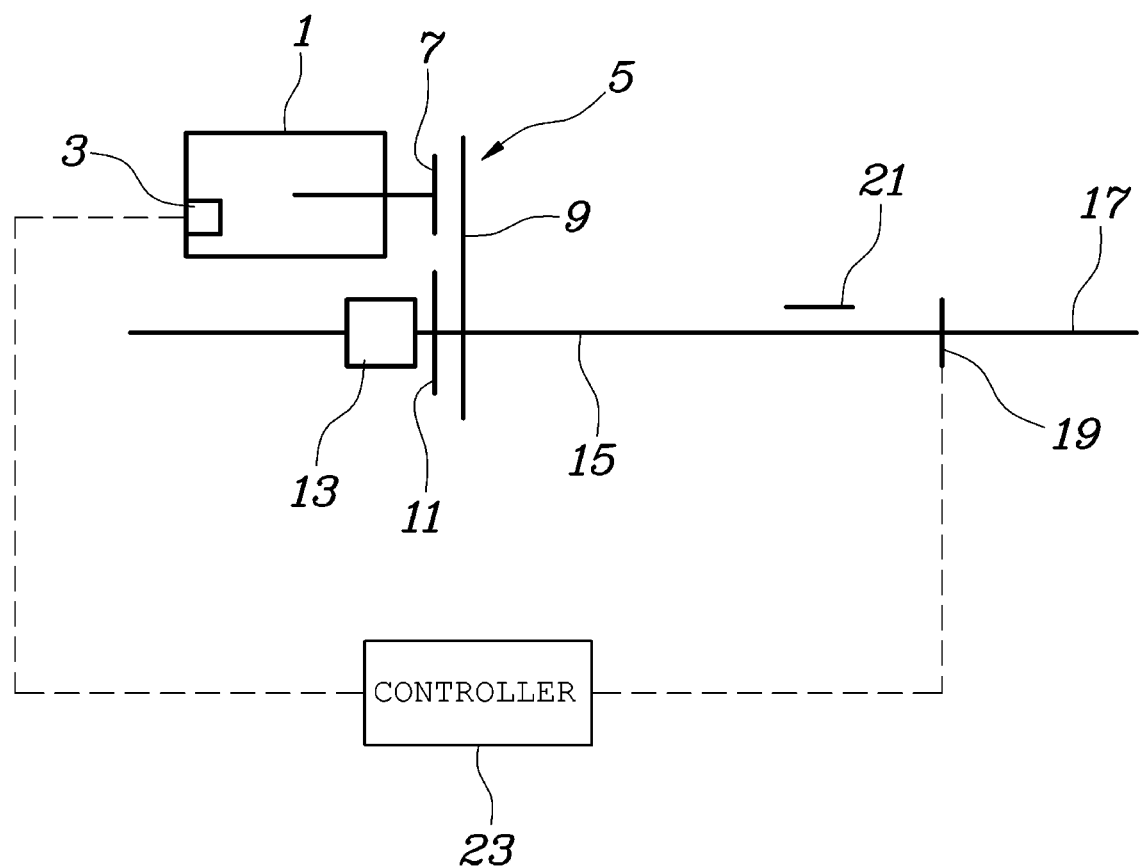

[Fig.2]
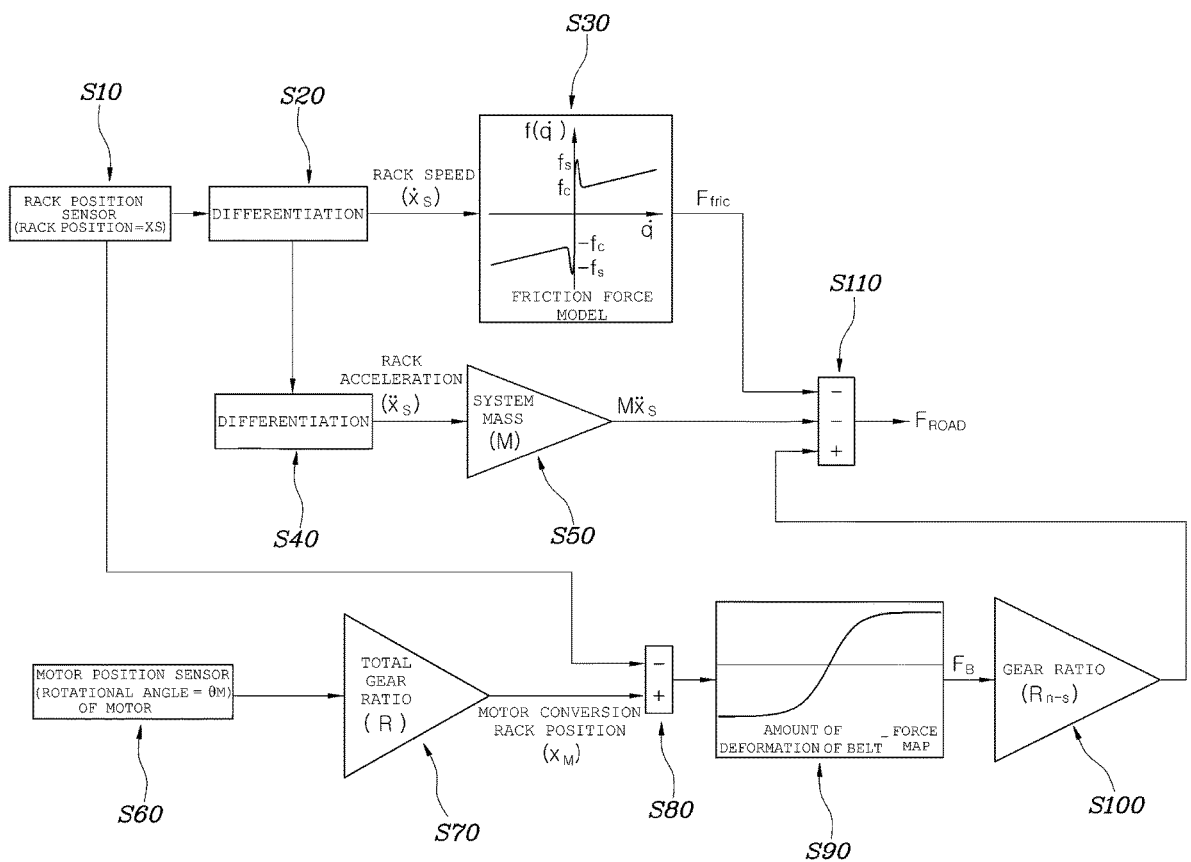

METHOD FOR ESTIMATING RACK FORCE OF STEER BY WIRE SYSTEM

CROSS-REFERENCE TO RELATED APPLICATION

This application claims the priority to and the benefit of Korean Patent Application No. 10-2018-0110664, filed on Sep. 17, 2018, the entire contents of which is incorporated herein by reference.

FIELD

The present disclosure relates to a method for estimating rack force of a Steer-By-Wire (SBW) system.

BACKGROUND

The statements in this section merely provide background information related to the present disclosure and may not constitute prior art.

A Steer-By-Wire (SBW) system, which is a steering system mechanically disconnecting a steering wheel and driving wheels of a vehicle from each other, can steer a vehicle by receiving a turn signal of the steering wheel through an Electronic Control Unit (ECU) and operating a steering assist motor (hereafter, referred to as a "steering motor") connected to the driving wheels on the basis of the input turn signal.

Since the SBW system does not have the mechanical connection structure that existing steering systems have, it is possible to more freely configure the layout of a steering system, improve fuel efficiency, and remove disturbance that is input back from wheels.

We have discovered that it is possible to monitor transverse force that is applied to tires (force that is applied to a rack bar=rack force) in terms of transverse control of a vehicle and steering response control because it has an influence on control of not only the vehicle, but the steering response.

In particular, since the SBW system does not provide physical connection between a rack bar and a driver, it may be desirable to let the driver recognize the information about road surfaces by measuring and estimating the rack force.

As a method of estimating rack force, there is transverse force estimation that uses an automotive kinetic model and rack force estimation that uses a steering system model. As a measuring method, there is a method of directly measuring force using a rod cell on a tie rod.

However, according to the rack force estimation method that uses an automotive kinetic model, there are differences in accuracy, depending on the models of tires, and the accuracy may be particularly low at low vehicle speeds.

Further, the case that uses a steering system model uses values obtained through a torque sensor on a column physically connected to a gear box may not be compatible with an SBW system because there is no physical connection, so it may be desirable to accurately know the force that is transmitted from the motor of a tire steering system to a rack.

The description provided above is solely for helping understanding the background of the present disclosure and should not necessarily be construed as being included in the related art known by those skilled in the art.

SUMMARY

The present disclosure provides a method for estimating rack force of an SBW system, the method measuring force that is transmitted to a rack bar from a motor on the basis of strength of members in the SBW and estimating the rack force using the force.

In accordance with an aspect of the present disclosure, there is provided a method for estimating rack force of a Steer-By-Wire (SBW) system that performs steering by transmitting operation force of a steering motor to a rack bar through a reducer connected between the steering motor and the rack bar, the method including: calculating restoring force that is applied to the reducer by means of a controller on the basis of the difference between position values of the rack bar that are obtained at the front end and the rear end of the reducer when the position of the rack bar is changed by operation of the steering motor; and calculating rack force by reflecting the restoring force to a motion equation including inertia force of the SBW system by means of the controller.

The calculating of restoring force may include: calculating a first position value of the rack bar from a motor position sensor in the steering motor; measuring a second position value of the rack bar through a rack position sensor that measures the position of the rack bar; calculating the difference between the first position value and the second position value; and calculating the restoring force by multiplying the difference by a spring constant of the reducer.

The reducer may be a belt-pulley type reducer and the restoring force may be calculated by multiplying the difference by a spring constant of the belt.

The reducer may be a belt-pulley type reducer and the restoring force may be calculated from a map defining the relationship between the difference and force applied to the belt.

Acceleration of the rack bar may be calculated by measuring a position value of the rack bar by a rack position sensor and inertia force may be calculated by multiplying the mass of the SBW system by the calculated acceleration of the rack bar.

The rack force may be calculated by subtracting inertia force from the product of a reduction ratio of the reducer and the restoring force in the calculating of rack force.

Friction force of the SBW system may be further subtracted from the product of the reduction ratio of the reducer and the restoring force.

According to the present disclosure, it is possible to estimate rack force even without an expensive torque sensor for estimating rack force by measuring movement differences of parts in the SBW system, by measuring the force that is transmitted from the steering motor to the rack bar on the basis of strength of the members disposed between the parts, and by estimating rack force using the difference and force, so it is possible to reduce the manufacturing cost of a vehicle.

Further, it is possible to reduce an estimation error of the rack force by finding out the force that is applied between the steering motor and the rack bar, using the strength of the parts in the SBW system.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a diagram schematically showing the configuration of an SBW system; and FIG. 2 is an operational flowchart for explaining the principle of measuring rack force.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

A steering system that is applied to rack force estimation of the present disclosure may be a Steer-By-Wire (SBW) system in which a steering wheel and a gear box are mechanically disconnected, in one aspect, an SBW system including a belt-pulley type reducer 5.

The configuration of an SBW system that is applied to the present disclosure is described hereafter with reference to FIG. 1. A steering motor 1 that provides steering force to a rack bar 17 is provided and a motor position sensor 3 that measures a rotational angle of the steering motor 1 is disposed in the steering motor 1.

A reducer 5 is disposed between the steering motor 1 and the rack bar 17 and torque that is provided from the steering motor 1 is converted into linear force and then transmitted to the rack bar 17.

A rack position sensor 19 is disposed on a rack housing 21 surrounding the rack bar 17, at a predetermined position facing the rack bar 17, and measures the position of the rack bar 17.

The structure of the belt-pulley type reducer 5 applied to the present disclosure is described hereafter. A driving pulley 7 is fitted on a rotary shaft of the steering motor 1, a driven pulley 11 making a pair with the driving pulley 7 is disposed coaxially with the rack bar 17, and the driving pulley 7 and the driven pulley 11 are connected through a belt 9 wound thereon to rotate together.

A ball nut 13 is coupled to the driven pulley 11 and rotated with the driven pulley 11, a ball screw 15 is formed at an end portion of the rack bar 17, and the ball nut 13 is thread-fastened to the ball screw 15.

That is, when torque from the steering motor 1 is transmitted to the ball nut 13 through the driving pulley 7, the driven pulley 11, and the belt 9, a rotational motion of the steering motor 1 is converted into a linear motion of the rack bar 17 by the mechanism of the ball nut 13 and the ball screw 15 and the rack bar 17 is moved linearly, so tires are moved.

A method for estimating rack force according to the present disclosure is described hereafter with reference to FIG. 2. The method largely includes a restoring force calculation step and a rack force calculation step.

In the restoring force calculation step, when the linear position of the rack bar 17 is changed by operation of the steering motor 1, a controller 23 calculates restoring force $F_B$ that is applied to the reducer 5 on the basis of the difference of position values of the rack bar 17 at the front end and the rear end of the reducer 5.

In the rack force calculation step, the controller 23 calculates rack force $F_{ROAD}$ by reflecting the restoring force $F_B$ into a motion equation including the inertia force $M\ddot{x}_s$ of the SBW system.

The step of calculating the restoring force $F_B$, for example, may include: calculating a first position value $x_m$ of the rack bar 17 from the motor position sensor 3 in the steering motor 1; measuring a second position value $x_s$ of the rack bar 17 through the rack position sensor 19 that measures the position of the rack bar 17; calculating the difference between the first position value $x_m$ and the second position value $x_s$; and calculating the restoring force $F_B$ by multiplying the difference by a spring constant of the reducer 5.

The reducer 5 is a belt-pulley type reducer, and as an example of calculating the restoring force $F_B$, it is possible to calculate the restoring force $F_B$ by multiplying the difference by the spring constant K of the belt 9.

As another example of calculating the restoring force $F_B$, it is possible to calculate the restoring force $F_B$ from a map defining the relationship between the difference and force that is applied to the belt 9.

That is, force/torque is calculated by usually measuring the amount of deformation of an elastic member having linearity and then multiplying the measured amount of deformation by the spring constant of the elastic member.

Assuming that the belt 9 is an elastic member, it is possible to calculate the amount of deformation of the belt 9 by measuring the positions of the front end and the rear end of the belt 9 and it is possible to calculate restoring force $F_B$ that is the force that is applied to the belt 9 (transmitted from the belt) by multiplying the amount of deformation by the spring constant K of the belt 9.

Further, it is also possible to calculate the restoring force $F_B$ by setting a map that defines the relationship between the amount of deformation and the force that is applied to the belt 9.

That is, since the motor position sensor 3 is disposed at the front end of the belt 9 and the rack position sensor 19 is disposed at the rear end of the belt 9 in the present disclosure, it is possible to obtain the amount of deformation that is the difference between the first position value $x_m$ of the rack bar 17 calculated from the motor position sensor 3 and the second position value $x_s$ of the rack bar 17 measured by the rack position sensor 19. Accordingly, as in the following Equation (1), it is possible to calculate the restoring force $F_B$ by multiplying the amount of deformation by the spring constant K of the belt 9.

$$F_B = K \cdot (x_m - x_s) \tag{1}$$

$F_B$: restoring force
K: spring constant of belt
$x_m$: first position value
$x_s$: second position value On the other hand, the inertia force of the SBW system according to the present disclosure can be calculated by multiplying the mass of the SBW system by the acceleration of the rack bar 17. To this end, the acceleration of the rack bar 17 is calculated by measuring and differentiating the position value of the rack bar 17 by the rack position sensor 19.

Accordingly, it is possible to calculate the inertia force by multiplying the mass of the SBW system by the calculated acceleration of the rack bar 17. The mass of the SBW system can be calculated by system modeling.

Meanwhile, in the rack force calculation step according to the present disclosure, it is possible to calculate rack force $F_{ROAD}$ by subtracting inertia force from the product of the restoring force $F_B$ and the reduction ratio of the reducer 5, as in the following Equation (3).

Further, it is possible to calculate rack force $F_{ROAD}$ by further subtracting the product of the restoring force $F_B$ and the reduction ratio of the reducer 5 from friction force $F_{fric}$ of the SBW system.

The friction force $F_{fric}$ can be estimated from an appropriate friction model and the reduction ratio may be the reduction ratio between the ball screw 15 and the ball nut 13.

That is, when the steering motor 1 is operated and the rack bar 17 correspondingly moves tires, friction force $F_{fric}$ of the SBW system and rack force (external force) from the tires are applied.

As a result, the resultant force of the inertia of the SBW system, the friction force $F_{fric}$ of the SBW system, and the rack force (external force) from tires is the same as the product of the reduction ratio and the restoring force $F_B$ that is the force transmitted from the belt 9, as in the following Equation (2)

$$R_{n\text{-}s}F_B = F_{ROAD} + F_{fric} + M\ddot{x}_s \quad (2)$$

$F_{ROAD}$: rack force
$R_{n\text{-}s}$: reduction ratio
$F_{fric}$: friction force
$M\ddot{x}_s$: inertia force
M: mass
$\ddot{x}_s$: acceleration Further, the equation is rearranged for rack force $F_{ROAD}$ as in the following Equation (3).

$$F_{ROAD} = R_{n\text{-}s}F_B - F_{fric} - M\ddot{x}_s \quad (3)$$

That is, the friction $F_{fric}$ and the mass M are obtained from appropriate model values, the acceleration of the rack bar 17 is calculated through the rack position sensor 19, the restoring force $F_B$ is calculated from Equation (1), and the reduction ratio is an already determined and known value, so the rack force $F_{ROAD}$ can be calculated and estimated.

A process of estimating the rack force $F_{ROAD}$ according to the present disclosure is sequentially described with reference to FIG. 2. First, a position value (second position value) of the rack bar 17 is measured by the rack position sensor 19 (S10).

Next, a rack speed is calculated by differentiating the measured second position value Xs (S20) and the calculated rack speed is reflected to friction force model data (S30), thereby estimating and securing friction force $F_{fric}$ of the SBW system.

Further, the acceleration of the rack bar 17 is calculated by differentiating again the rack speed obtained through differentiation in S20 (S40) and the calculated acceleration of the rack bar 17 is multiplied by the mass of the system (S50), thereby calculating and securing the inertia force of the SBW system.

The rotational angle of the steering motor 1 is measured by the motor position sensor 3 (S60).

Next, a position value (first position value) of the rack bar 17 that is converted from the motor position sensor 3 is obtained by reflecting a total gear ratio R added with a pulley gear ratio and the gear ratio Rn-s of the ball nut 13 and the ball screw 15 to the measured rotational angle.

The difference between the first position value xm and the second position value Xs is calculated (S80) and the restoring force $F_B$ is obtained by multiplying the calculated difference by the spring constant K of the belt 9 or using a map defining the relationship between the difference and the restoring force $F_B$ (S90).

Next, the restoring force $F_B$ is multiplied by the gear ratio of the ball nut 13 and the ball screw 15 (S100) and the friction force $F_{fric}$ obtained in S30 and the inertia force obtained in S50 is subtracted from the product (S110), whereby the rack force $F_{ROAD}$ can be calculated and estimated.

As described above, according to the present disclosure, it is possible to estimate rack force even without an expensive torque sensor for estimating rack force by measuring movement differences of parts in the SBW system, by measuring the force that is transmitted from the steering motor 1 to the rack bar 17 on the basis of strength of the members disposed between the parts, and by estimating rack force $F_{ROAD}$ using the differences and force, so it is possible to reduce the manufacturing cost of a vehicle. Further, it is possible to reduce an estimation error of the rack force $F_{ROAD}$ by finding out the force that is applied between the steering motor 1 and the rack bar 17, using the strength of the parts in the SBW system.

On the other hand, although the present disclosure was described with reference to the detailed embodiments, it will be apparent to those skilled in the art that the present disclosure may be modified in various ways without departing from the scope of the present disclosure.

What is claimed is:

1. A method for estimating rack force of a Steer-By-Wire (SBW) system, the method comprising:
    calculating, by a controller, a restoring force in the SBW system, the SBW system performing steering by transmitting operation force of a steering motor to a rack bar through a reducer connected between the steering motor and the rack bar, the restoring force being applied to the reducer on the basis of the difference between position values of the rack bar that are obtained at a front end and a rear end of the reducer when the position of the rack bar is changed by operation of the steering motor; and
    calculating, by the controller, rack force by reflecting the restoring force to a motion equation including inertia force of the SBW system,
    wherein the calculating of restoring force includes:
        calculating a first position value of the rack bar from a motor position sensor in the steering motor;
        measuring a second position value of the rack bar through a rack position sensor that measures the position of the rack bar;
        calculating the difference between the first position value and the second position value; and
        calculating the restoring force by multiplying the difference by a spring constant of the reducer.

2. The method of claim 1, wherein the reducer is a belt-pulley type reducer and the restoring force is calculated by multiplying the difference by a spring constant of the belt.

3. The method of claim 1, wherein the reducer is a belt-pulley type reducer and the restoring force is calculated from a map defining the relationship between the difference and force applied to the belt.

4. The method of claim 1, wherein acceleration of the rack bar is calculated by measuring a position value of the rack bar by a rack position sensor; and
    inertia force is calculated by multiplying a mass of the SBW system by the calculated acceleration of the rack bar.

5. The method of claim 1, wherein the rack force is calculated by subtracting the inertia force from the product of a reduction ratio of the reducer and the restoring force in the calculating of rack force.

6. The method of claim 5, wherein friction force of the SBW system is further subtracted from the product of the reduction ratio of the reducer and the restoring force.

7. A steer-by-wire (SBW) system comprising:
a steering motor, a rack bar, and reducer operably connecting the steering motor to the rack bar; and
a controller operably connected with the reducer;
wherein the controller is configured to calculate a restoring force in the SBW system, the SBW system performing steering by transmitting operation force of a steering motor to a rack bar through a reducer connected between the steering motor and the rack bar, the restoring force being applied to the reducer on the basis of the difference between position values of the rack bar that are obtained at a front end and a rear end of the reducer when the position of the rack bar is changed by operation of the steering motor; and
wherein the controller is configured to calculate a rack force by reflecting the restoring force to a motion equation including inertia force of the SBW system,
wherein the controller is further configured to:
calculate a first position value of the rack bar from a motor position sensor in the steering motor;
measure a second position value of the rack bar through a rack position sensor that measures the position of the rack bar;
calculate the difference between the first position value and the second position value; and
calculate the restoring force by multiplying the difference by a spring constant of the reducer.

* * * * *